United States Patent [19]
Kruse

[11] Patent Number: 5,265,562
[45] Date of Patent: Nov. 30, 1993

[54] INTERNAL COMBUSTION ENGINE WITH LIMITED TEMPERATURE CYCLE

[76] Inventor: Douglas C. Kruse, 9440 Irondale Ave., Chatsworth, Calif. 91311

[21] Appl. No.: 919,916

[22] Filed: Jul. 27, 1992

[51] Int. Cl.[5] .......................... F02B 1/14; F02B 41/00; F02D 41/26
[52] U.S. Cl. .................................. 123/27 R; 123/37; 123/299
[58] Field of Search ...................... 123/299, 300, 27 R, 123/27 GE, 27 A, 37

[56] References Cited

U.S. PATENT DOCUMENTS

| | | | |
|---|---|---|---|
| 2,917,031 | 12/1959 | Nestorovic | 123/299 |
| 3,125,076 | 3/1964 | Mullaney | 123/27 R |
| 4,070,998 | 1/1978 | Grow | 123/37 X |
| 4,704,999 | 11/1987 | Hashikawa et al. | 123/299 |
| 4,836,161 | 6/1989 | Abthoff et al. | 123/299 |
| 4,858,579 | 8/1989 | Elsbett et al. | 123/299 |
| 4,977,875 | 12/1990 | Kumagai et al. | 123/299 |
| 5,101,785 | 4/1992 | Ito | 123/299 X |

Primary Examiner—Willis R. Wolfe
Attorney, Agent, or Firm—Spensley Horn Jubas & Lubitz

[57] ABSTRACT

An expandable chamber piston type internal combustion engine operating in an open thermodynamic cycle includes a combustion process having a constant volume (isochoric) phase followed by a constant temperature (isothermal) phase.

8 Claims, 8 Drawing Sheets

STATE (POINT 1)

| | | | LEGEND | | |
|---|---|---|---|---|---|
| P1 | = | GIVEN | P1 | = | INITIAL CYL. PRESSURE AT BDC INTAKE STR, PSIA |
| T1 | = | GIVEN | T1 | = | INITIAL FLUID TEMP AT BDC INTAKE STR, °R |
| V1 | = | GIVEN | V1 | = | INITIAL CYL. VOLUME AT BDC INTAKE STR, IN³ |
| CR | = | GIVEN | CR | = | CYCLE COMPRESSION RATIO |
| TMAX | = | GIVEN | TMAX | = | MAXIMUM CYCLE TEMPERATURE, °R |
| N | = | GIVEN | N | = | ENGINE SPEED, RPM |
| OFAR | = | GIVEN | OFAR | = | OVERALL FUEL-TO-AIR RATIO |

ISENTROPIC COMPRESSION TO POINT 2

PATH 1-2

$$V2 = V1/CR$$

$$T2 = T1 \left[ \frac{\left[\frac{V1}{V2}\right]^{KU-1} - 1}{NS} + 1 \right]$$

$$P2 = P1 \left[\frac{V1}{V2}\right]^{KU}$$

$$WC = CVU(T1-T2)$$

$$TMA = (NV)(N)(V1-V2)P1/21.31 T1$$

| | | LEGEND |
|---|---|---|
| P2 | = | CYL. PRESSURE AT TDC COMPR STR, PSIA |
| T2 | = | FLUID TEMP AT TDC COMPR STR, °R |
| V2 | = | CYL. VOLUME AT TDC COMPR STR, IN³ |
| KU | = | RATIO OF SPECIFIC HEATS, UNBURNED MIXTURE |
| NS | = | ISENTROPIC EFFICIENCY |
| NV | = | CYCLE VOLUMETRIC EFFICIENCY |
| WC | = | COMPRESSION WORK, BTU/lbm |
| CVU | = | SPECIFIC HEAT, CONSTANT VOLUME, UNBURNED MIXTURE, BTU/lbm °R |
| TMA | = | TOTAL MASS AIRFLOW, lb/hr |

POINT 2

FIG. 5A

POINT 2

LIMITED TEMPERATURE CONSTANT VOLUME COMBUSTION TO POINT 3

PATH 2-3

| | | LEGEND | | |
|---|---|---|---|---|
| | | $P3$ | = | CYL. PRESSURE AT END OF CONST VOL COMB, PSIA |
| | | $T3$ | = | FLUID TEMP AT END OF CONST VOL COMB, °R |
| $T3$ = $TMAX$ | | $V3$ | = | CYL. VOLUME AT END OF CONST VOL COMB, IN³ |
| $P3$ = $P2(T3/T2)$ | | $CVB$ | = | SPECIFIC HEAT, CONSTANT VOLUME, BURNED MIX, BTU/lbm °R |
| $V3$ = $V2$ | | | | |
| $QCV$ = $CVB(T3-T2)$ | | $QCV$ | = | CONSTANT VOLUME COMB HEAT, BTU/lbm |
| $OMF$ = $OFAR(TMA)$ | | $OMF$ | = | OVERALL FUEL FLOW, lb/hr |
| $QTOT$ = $OMF(QF)$ | | $QTOT$ | = | TOTAL FUEL HEAT INPUT, BTU/hr |
| $QCYC$ = $NC(QTOT)/[(1+OFAR)(TMA)]$ | | $QF$ | = | LOWER HEATING VALUE OF FUEL, BTU/lbm |
| | | $NC$ | = | COMBUSTION EFFICIENCY |
| | | $QCYC$ | = | CYCLE FUEL HEAT INPUT, BTU/lbm |

CONSTANT TEMPERATURE COMBUSTION/EXPANSION TO POINT 4

PATH 3-4

| | | LEGEND | | |
|---|---|---|---|---|
| $QCT = QCYC - QCV$ | | $QCT$ | = | CONSTANT TEMP COMB HEAT, BTU/lbm |
| $T4 = T3$ | | $P4$ | = | CYL. PRESSURE AT END OF CONST TEMP COMB, PSIA |
| $V4 = (V3)e^{\left[\frac{(QCT)J}{R(T4)}\right]}$ | | $T4$ | = | FLUID TEMP AT END OF CONST TEMP COMB, °R |
| | | $V4$ | = | CYL. VOLUME AT END OF CONST TEMP COMB, IN³ |
| $P4 = P3(V3/V4)$ | | $J$ | = | CONVERSION CONSTANT, 778 ft-lbf/BTU |
| $WEXT = \frac{(R)(T4)}{J}\left[\ln\frac{P3}{P4}\right]NT$ | | $R$ | = | UNIVERSAL GAS CONSTANT, $\frac{ft-lbf}{lbm-°R}$ |
| | | $WEXT$ | = | EXPANSION WORK AT CONSTANT TEMP, BTU/lbm |
| | | $NT$ | = | ISOTHERMAL EFFICIENCY |

FIG. 5B

POINT 4

POINT 4
ISENTROPIC EXPANSION

PATH 4-5

LEGEND

$V5 = V1$
$T5 = T4[1-NS\{1-(V4/V5)^{KB-1}\}]$
$P5 = P4(V4/V5)^{KB}$
$WEXS = CVB(T4-T5)$

| | | |
|---|---|---|
| P5 | = | CYL. PRESSURE AT END OF ISENTROPIC EXP, PSIA |
| T5 | = | FLUID TEMP AT END OF ISENTROPIC EXP, °R |
| V5 | = | CYL. VOLUME AT END OF ISENTROPIC EXP, IN³ |
| KB | = | RATIO OF SPECIFIC HEATS, BURNED MIXTURE |
| WEXS | = | EXPANSION WORK, ISENTROPIC, BTU/lbm |
| CVB | = | SPECIFIC HEAT, CONSTANT VOLUME, BURNED MIX, BTU/lbm °R |

BLOWDOWN, EXHAUST & INTAKE TO STATE 1 (ASSUMED IDEAL)

PERFORMANCE SUMMARY

LEGEND

$$WNET = \frac{[WC+(WEXT+WEXS)(1+OFAR)]}{(1+OFAR)}$$

$IHP = (1+OFAR)(TMA)(WNET)/2545$ $IMEP = (792,000)(IHP)/[(N)(V1-V2)]$ $NCYC = WNET/QTOT$ $$NCYC = \frac{(WNET)(1+OFAR)\ TMA}{QTOT}$$

| | | |
|---|---|---|
| WNET | = | NET INDICATED WORK, BTU/lbm |
| IHP | = | INDICATED HP (PER CYLINDER) |
| IMEP | = | INDICATED MEAN EFFECTIVE PRESSURE, PSIA |
| NCYC | = | INDICATED CYCLE EFFICIENCY |

INTERNAL COMBUSTION ENGINE WITH LIMITED TEMPERATURE CYCLE

FIELD OF THE INVENTION

The present invention relates generally to internal combustion engines and more particularly to expandable chamber piston engines operating in an open thermodynamic cycle.

BACKGROUND OF THE INVENTION

Automotive vehicle and engine manufacturers, fuel injection equipment suppliers and, indeed, society as a whole, share in the desire for efficient, effective transportation. The balance between combustion processes to produce power, and those processes which create pollution, is best addressed by enhancing the fundamental efficiency of the engine processes.

It is well known that the ideal Carnot cycle, in which isothermal heat addition and rejection are combined with isentropic compression and expansion, is the most efficient engine cycle for any given upper and lower operating temperatures. However, the Carnot cycle is not practical for an expanding chamber piston engine due to the very high (over 50:1) compression ratio required to produce significant power. Nevertheless, a practical process which could make some use of the highly efficient Carnot process would be an advance in the art.

The most practical engine, and thus presently the most predominant, is the Otto cycle engine which includes a compression process of a fuel-air mixture followed by unregulated combustion. It is well known that for a given compression ratio the ideal Otto cycle is the most efficient expanding chamber piston engine since the Otto cycle combines high peak temperature with a practical average temperature of heat input. However, the high peak combustion temperature of an Otto engine can cause auto-ignition of a portion of the fuel-air mixture, resulting in engine noise and damage to the engine, as well as the creation of excess amounts of undesired NOx.

In the past, auto-ignition in Otto cycle engines was reduced by use of chemical additives to the fuel such as lead compounds (no longer permitted by law), manganese compounds (which cause spark plug deposits to build up, resulting in misfire), benzene (the use of which is presently being curtailed by legislative mandate) or fuel reformulations to prevent deleterious auto-ignition while meeting environmental goals. Auto-ignition can also be reduced by limiting the combustion temperature, either through use of a lower compression ratio (which reduces both power and efficiency), or by exhaust gas recirculation, lean-burn or stratified charge techniques, all of which cause power loss.

For general purpose road use, the engines of emission-constrained passenger cars are presently limited to useful compression of about 10:1. Above that limit the increased cost of the fuel control system and the additional cost of more platinum or rhodium for exhaust catalytic converters generally outweighs the benefit of higher compression ratios. A technology which would allow a practical Otto compression process to operate at compression ratios higher than 10:1 would be an advance in the art.

An improvement on the Otto cycle, as represented by a higher useful compression ratio, is an ideal Diesel cycle comprising isothermal heat addition and isochoric (constant volume) heat rejection combined with isentropic compression and expansion. This ideal Diesel cycle overcomes the fuel octane limit of the Otto cycle by utilizing air alone for the compression process and mixing the fuel with the process air as part of the combustion process. This allows use of a low octane-rated fuel, but requires cetane-rated fuel (enhanced auto-ignition). However, the isothermal process of the aforedescribed ideal Diesel cycle was found to be impractical, due to the extremely high compression ratio (50:1) required, and an alternate heat addition process (isobaric or constant pressure) was put into practice.

Another variation on the ideal Diesel cycle is the ideal limited pressure cycle including combined isochoric and isobaric heat addition, and isochoric heat rejection combined with isentropic compression and expansion. This combustion process allows an engine to be operated at moderate compression ratios (14:1 to 17:1 for large open chamber engines) as well as high compression ratios (20:1 to 25:1 for small displacement engines).

While Diesel-type engines are fuel efficient, due to their high compression ratio, they tend to be heavier and lower in power than an Otto engine of the same displacement. In addition, all direct injection engines of the Diesel type suffer from an ignition lag which reduces the control and effectiveness of the combustion process. One way to overcome this ignition lag is to preheat the fuel to 1,500° R before injection. This produces hypergolic combustion upon injection, but is an impractical method due to the short service life of the injector nozzle.

Hybrid engine processes have been developed incorporating characteristics of both diesel and spark ignition engines but these have proven impractical for road use. Examples of these hybrid processes include the Texaco TCCS, the Ford PROCO, Ricardo, MAN-FM and the KHD-AD. All employ open chamber, direct injection spark ignition engines using stratified charge techniques to improve efficiency. These developmental engines suffer substantial power loss because of ignition lag, incomplete utilization of the process air and poor mixing of the fuel/air charge.

Because the limits of current technology are thus being reached, there exists a need for an internal combustion engine that will provide a better balance between power production, fuel efficiency, pollution creation and pollution control by use of a more practical combination of thermodynamic processes.

SUMMARY OF THE INVENTION

Basically, the present invention meets the foregoing requirements and constraints by utilizing a new combination of thermodynamic processes which limits maximum combustion temperature, thereby enabling an internal combustion engine to operate at a higher compression ratio, a higher power output or a lower peak temperature with a given fuel.

Broadly, in accordance with one exemplary embodiment, the invention is practiced by controlling the fuel quantity and injection timing of a direct injection system in an internal combustion engine, so as to produce a combustion process consisting of a constant volume (isochoric) phase and a constant temperature (isothermal) phase. The limited temperature engine cycle so achieved allows the use of substantially higher compression ratios with a given fuel or with a given NOx emission limit, thereby providing a higher practical thermal efficiency than the standard lower compression ratio Otto cycle when measured by fuel/air analysis or by analyzing the test data of an actual engine.

In addition, the limited temperature cycle so achieved allows a higher power output and a lower NOx creation rate at a given compression ratio with a low quality fuel.

In accordance with another aspect of the invention, there is provided a new method of operating an expanding chamber internal combustion piston engine for providing limited temperature combustion. Such an engine includes at least one cylinder and an associated piston for forming a combustion chamber with the piston having a top dead center position; an operating cycle including an intake stroke, a compression stroke and an expansion stroke; and a fuel introduction system. The method of operating the engine pursuant to the invention comprises the steps of first forming a predetermined fuel/air mixture by introducing a predetermined fraction in one or more discrete quantities of the total fuel necessary for complete combustion of the process air. Next, the relatively lean fuel/air mixture so introduced is ignited when the piston is substantially at top dead center, this first phase of combustion thereby comprising a substantially isochoric or constant volume process. The fuel supplied for the isochoric process is an amount which will produce a greatly reduced temperature of the working fluid, as low as 3,300 degrees Rankine, or less, even at high compression ratios. Last, there is introduced, substantially at the beginning of the expansion stroke, a second fraction (in one or more discrete quantities) of the total fuel necessary for complete combustion. The combustion resulting from the introduction of the second fraction is a substantially isothermal process. The isothermal process occurs at a temperature which is significantly less than that attained in a comparable Otto cycle engine having the same or a substantially lower compression ratio. NO$x$ emissions are thereby limited and such reduction is obtained at lower cost than existing systems.

Those skilled in the art will recognize that the method of the present invention makes use of the Otto process for the first phase of the heat input or combustion process and the Carnot process for the second phase of heat input or combustion process. Comparison of the operating cycle of the invention with the standard Otto cycle using ideal fuel/air analysis shows an unexpected benefit from the invention: the overall operating efficiency of an engine (with a given compression ratio) will be greater using the limited temperature cycle of the present invention than when using the Otto cycle, when high temperature losses are considered. This increase in efficiency at a given compression ratio is a benefit derived from reduced cycle temperature.

Another advantage of the present invention is that it allows an engine to be operated more efficiently (at a higher compression ratio) than is possible with present engines. The most readily available motor vehicle gasoline fuels have combustion quality ratings of about 90 octane, which generally limits many engines to a compression ratio of about 10:1 for public road use. Since octane rating is indirectly related to high combustion temperature (high operating temperatures require high octane fuel), and the invention reduces the operating temperature, it follows that the invention enables the use of a higher engine compression ratio with a commensurate gain in engine efficiency.

In sum, the method of the present invention allows a practical engine to make use of an ideal process: during the isothermal combustion process, heat energy is converted directly to work. The invention utilizes present engine design and materials and may be practiced by modifying existing internal combustion engines to incorporate the desired compression ratio and appropriate fuel introduction systems.

BRIEF DESCRIPTION OF THE DRAWINGS

Further objects, advantages and features of the invention will become evident from the detailed description of the preferred embodiment when read in conjunction with the accompanying drawings in which:

FIGS. 5A–5C together depict a flow chart showing steps for analyzing the engine cycle of the present invention and for calculating engine performance and other operating parameters;

DETAILED DESCRIPTION OF THE PREFERRED EMBODIMENTS

Figures 1, 2:
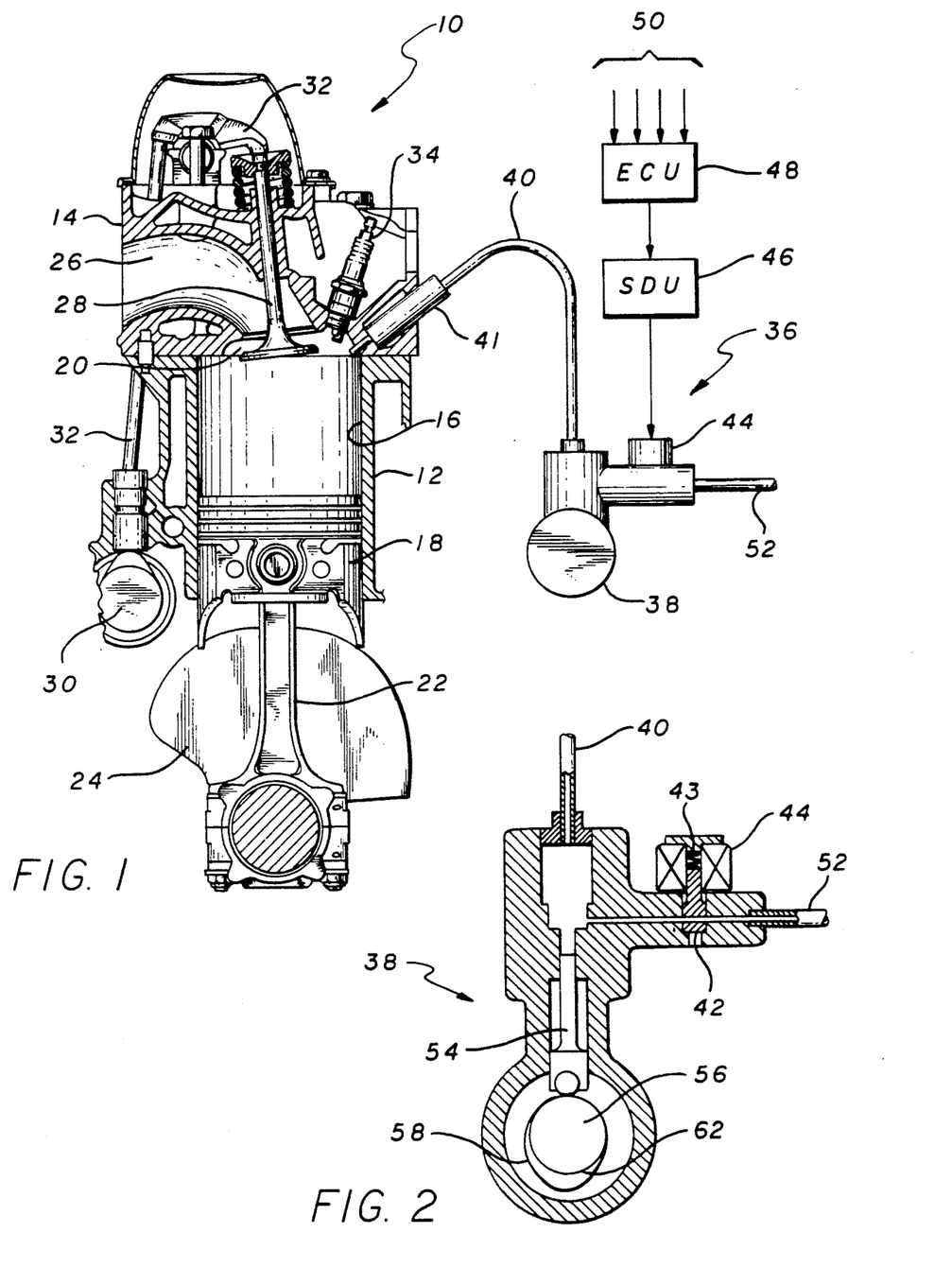
FIG. 1 is a schematic representation of a portion of a four-cycle internal combustion engine utilizing the principles of the present invention.
FIG. 2 is a side elevation view, in cross section, of a solenoid-operated fuel injector which may be used in the engine depicted in FIG. 1, the injector including a plunger cam providing fuel injection volumes and rates in accordance with the present invention.

With reference to FIG. 1, there is shown in schematic form a normally aspirated, four-cycle spark ignition engine 10 employing the teachings of the present invention. It will become evident to those skilled in the art that the advantages of the invention may be realized with two-cycle spark ignition engines, as well as Wankel rotary-type engines and those that are turbo- or supercharged. Further, although a single cylinder is shown in FIG. 1 for simplicity, it will be understood that an engine incorporating the invention will typically have multiple cylinders.

The engine 10 comprises a block 12, a cylinder head 14 and a cylinder 16 having a piston 18 adapted to reciprocate between top and bottom dead centers within the cylinder 16 to define with the cylinder 16 a combustion chamber 20. The reciprocating motion of the piston 18 is converted to rotational output motion by means of a connecting rod 22 and a crankshaft assembly 24, all as well known in the art. As will be explained in greater detail below, in accordance with the invention the compression ratio of the engine 10 will typically be substantially higher than that of a conventional automotive spark ignition internal combustion engine. For example, while a conventional engine may have a compression ratio of 8:1 to 10:1, an engine employing the teachings of the present invention may have a compression ratio of 18:1.

The engine 10 further includes an air induction system 26 including an air intake valve 28 in the cylinder head 14. The valve 28, along with an exhaust valve (not visible in FIG. 1), is actuated by a conventional cam shaft 30 and related valve train mechanism 32. Also mounted in the cylinder head 14 is a spark plug 34 whose energization is controlled and timed by means well known in the art.

Referring now also to FIG. 2, fuel is supplied to the engine 10 by a fuel injection system 36 which precisely regulates the fuel/air mixture for combustion and exhaust emission control. The fuel injection system 36 includes an electrically actuated fuel injection pump 38 installed in or adjacent to the cylinder head 14 and adapted to inject predetermined quantities of fuel directly into the combustion chamber 20 via an injection line 40 and an injector nozzle 41 terminating inside the combustion chamber 20 and adjacent to the spark plug 34. The injector pump 38 may, for example, take the form of a Model 200 fuel injection unit manufactured by AMBAC International, with a modified cam as described below and the addition of a solenoid 44. The injector pump 38 has a fuel spill valve 42 operated against the bias of a spring 43 by the solenoid 44 energizable by a solenoid drive unit (SDU) 46. The drive unit 46 is in turn controlled by an electronic control unit (ECU) 48 which monitors, by means of appropriate sensors, selected engine operating conditions such as intake and exhaust manifold pressures, engine speed, ignition firing position, throttle position, engine temperature, and so forth. Electrical signals representing these conditions are applied as inputs 50 to the control unit 48. As is known in the art, the electronic control unit 48, based on the multiple inputs 50, electronically calculates the timing and metering of the fuel introduced into the combustion chamber 20 by the injection pump 38.

Fuel is supplied to the fuel injector unit 38 by a feed pump (not shown) through a fuel line 52 at a sufficiently high pressure to produce proper fuel flow and to prevent vapor formation in the fuel system during extended high-temperature operation. When the solenoid 44 is energized by the solenoid drive unit 46, the valve 42 closes and, because the displacement of the plunger 54 is known, the fuel quantity injected is controlled solely by varying the injector pulse width, that is, the duration the valve 42 is held closed.

The injector pump 38 includes a piston type pumping plunger 54 actuated by a cam 56 having a cam follower surface or cam lobe 58 in engagement with the plunger 54; the cam 56 is rotatable at engine crank shaft speed.

Figure 3A:
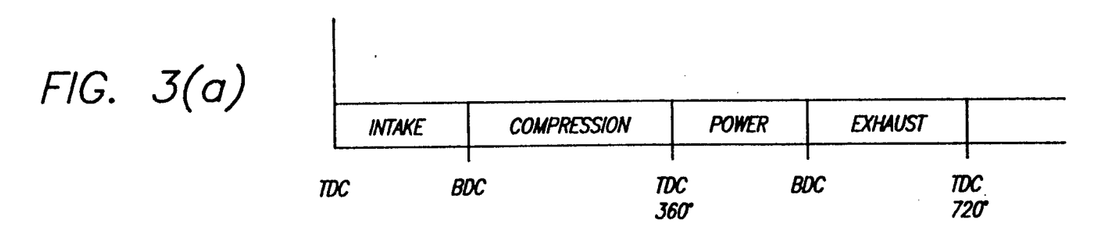
FIG. 3 includes plots of (1) fuel injector plunger lift versus engine crank angle and (2) injected fuel volumes versus engine crank angle in accordance with one exemplary operating condition of an engine in accordance with the present invention.
Figure 3B:
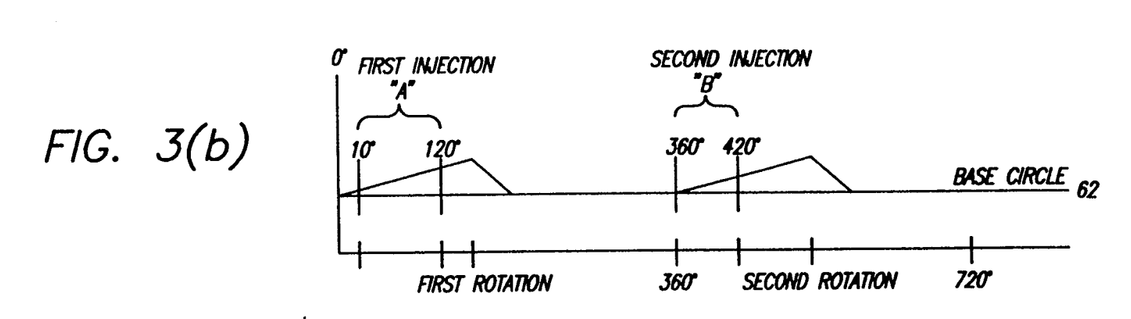
Figure 3C:
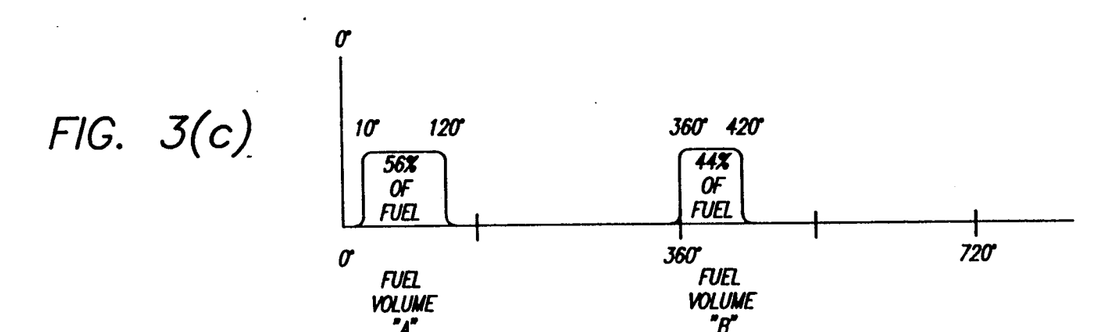

As shown in FIG. 3, the cam 56 has a lift profile, as a function of crank angle, having a first linear portion 60 rising from a base circle 62 to a maximum lift of about ½ inch through an angular crank displacement of about 180°, and a second linear portion 64 dropping back to the base circle in about 60° of crank displacement.

FIG. 3 shows a fuel injection schedule for a single, exemplary operating condition, namely, wide open throttle for a Limited Temperature Cycle, four-cycle engine having a compression ratio of 18:1 and a peak temperature of about 3,300° R. The fuel injection schedule of FIG. 3 provides for two successive injections of fuel volumes A and B. As already explained, the fuel volumes A and B are functions only of the durations that the injector 38 is active, as determined by the electronic control unit 48.

Usually, a fuel injection pump is driven at camshaft speed, that is, at one half engine crankshaft speed. Here, the pump is rotated at engine crankshaft speed with the embodiment shown in FIG. 2 having its cam lobe 58 starting its lift essentially at the beginning of the engine intake stroke (0°). This provides a first fuel injection volume (shown as A in FIG. 3) during the intake stroke, similar to an Otto engine. The pump cam 56 completes its first rotation at the end of the engine compression stroke (360°). The next rotation of the pump cam 56 will inject the second fuel volume (volume B) during the power stroke in a manner which produces essentially constant temperature combustion.

Fuel volume A, comprising about 56% of the total fuel required for complete combustion of the process air, is injected during the intake stroke of the piston 18 between about 10° and 120° (engine crank angle) after top dead center. Substantially at the end of the compression stroke (360° or top dead center), the second volume, B, comprising the remaining 44% of the total amount of fuel required for complete combustion, is injected, such second injection terminating at about 60° after TDC, i.e., at about 420°. Ignition by the spark plug 34 in the example under consideration will typically be provided at 5° to 10° before top dead center.

The combustion of the fuel/air mixture based on injected volume A comprises a first combustion phase which, as in the standard Otto cycle, is a substantially constant volume process. The first combustion phase will, of course, comprise a very lean mixture which, in the absence of the second phase of combustion to be described, would tend to markedly reduce engine power. The combustion of fuel volume B takes place at substantially constant temperature, that is, isothermally, providing both power and efficiency. It has been determined that the temperature at which this second combustion phase takes place is limited and less than that which would be attained in a standard Otto cycle engine of even modest compression ratio, for example, 8:1 or 10:1. Thus, the limited temperature cycle of the present invention permits the designer to dramatically increase the compression ratio of an engine for a given fuel, for example, to as high as about 18:1, providing all of the advantages, including high efficiency and power output, derived from a high compression ratio engine without the thermal, detonation and emission penalties.

A majority of the fuel is pre-mixed, generally 50% to 90%, for constant volume combustion. This first process is combined with a second fuel portion supplied during the combustion process at a rate to, first, limit maximum pressure, and second, limit maximum cylinder temperature.

The engine cycle of the present invention has a higher thermal efficiency than a Carnot cycle with the same average temperature of heat input.

Figure 4A:
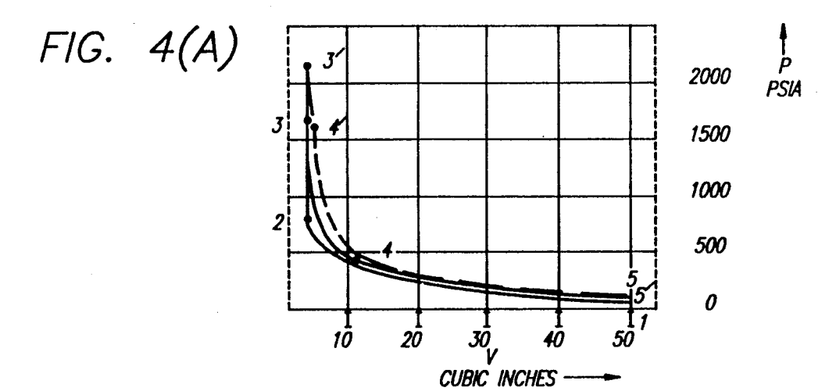
FIG. 4 shows pressure-volume and related engine cycle diagrams further explaining the cycle of the present invention.
Figure 4B:
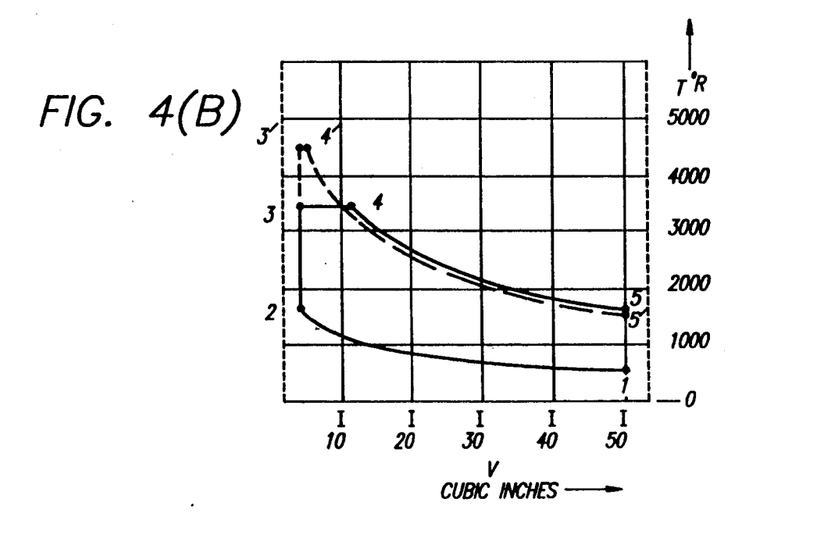
Figure 4C:
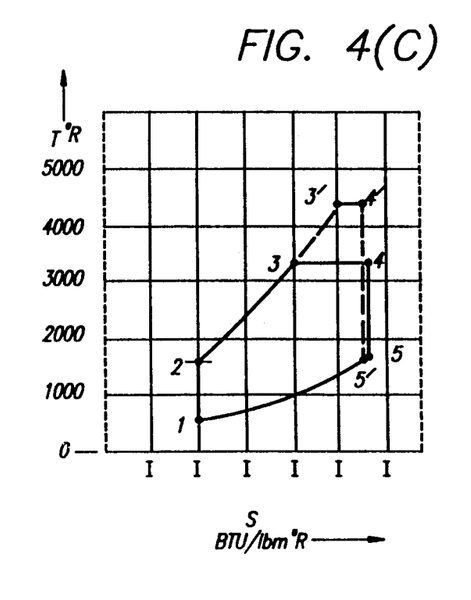

FIG. 4 shows three engine cycle diagrams (pressure-volume, temperature volume, and temperature-entropy) comparing examples of the limited temperature cycle of the present invention for two maximum combustion chamber temperatures ($T_{max}$), namely, 3,300° R and 4,300° R. The engine cycle of the first example ($T_{max}$=3,300° R) is defined by the points 1-2-3-4-5-1 in the diagrams of FIG. 4 and that of the second example ($T_{max}$=4,300° R) by the points 1-2-3'-4'-5'-1. In FIG. 4, path 1-2 is an 18:1 isentropic compression and paths 2-3 and 2-3' are constant volume combustion processes using, in the first example, 56% of the fuel necessary for complete combustion of the process air. Paths 3-4 and 3'-4' are isothermal processes using, in the first example, the remaining 44% of the fuel. Paths 4-5 and 4'-5' are isentropic expansion processes and paths 5-1 and 5'-1 are constant volume exhaust processes.

Figure 5A:
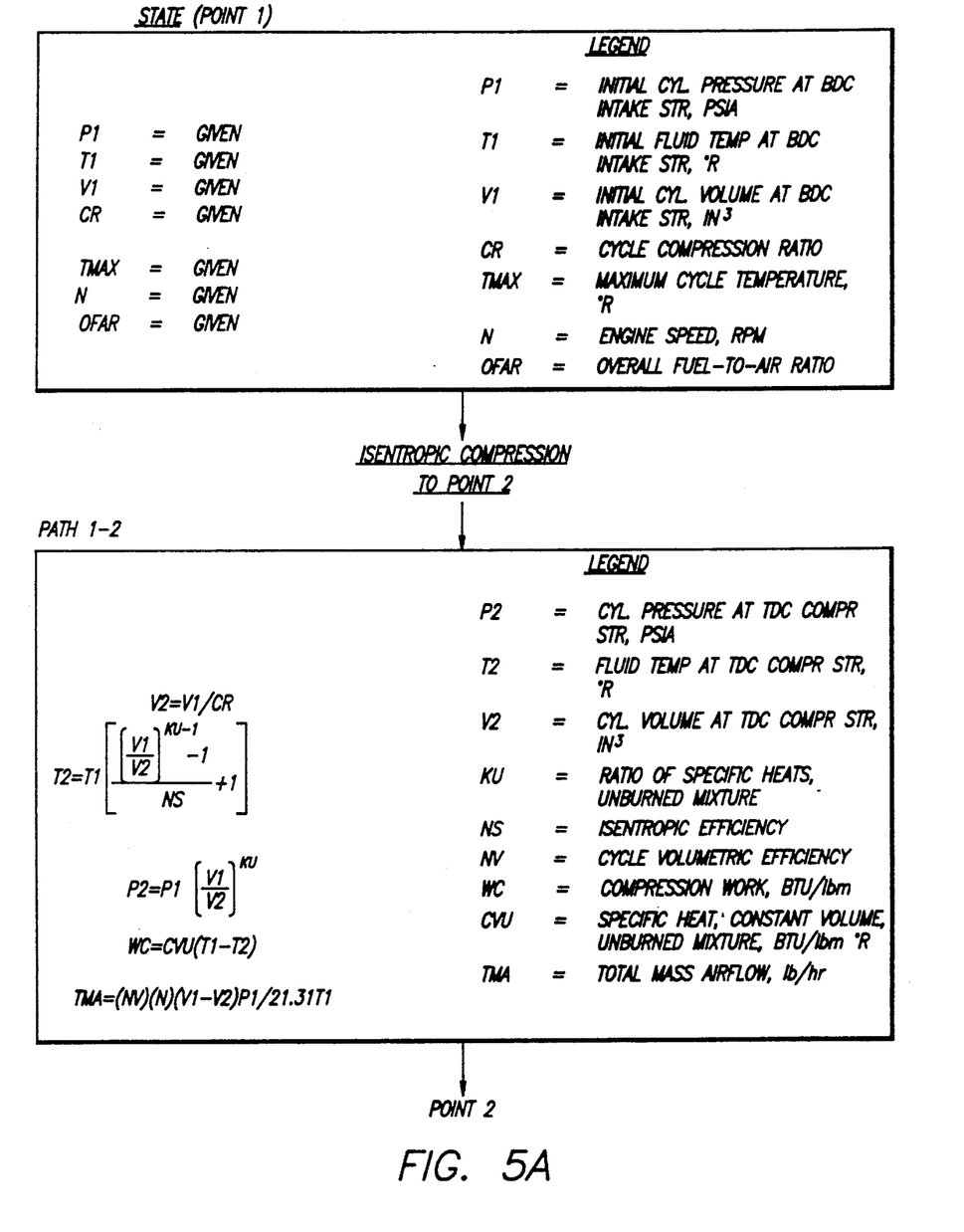
Figure 5C:
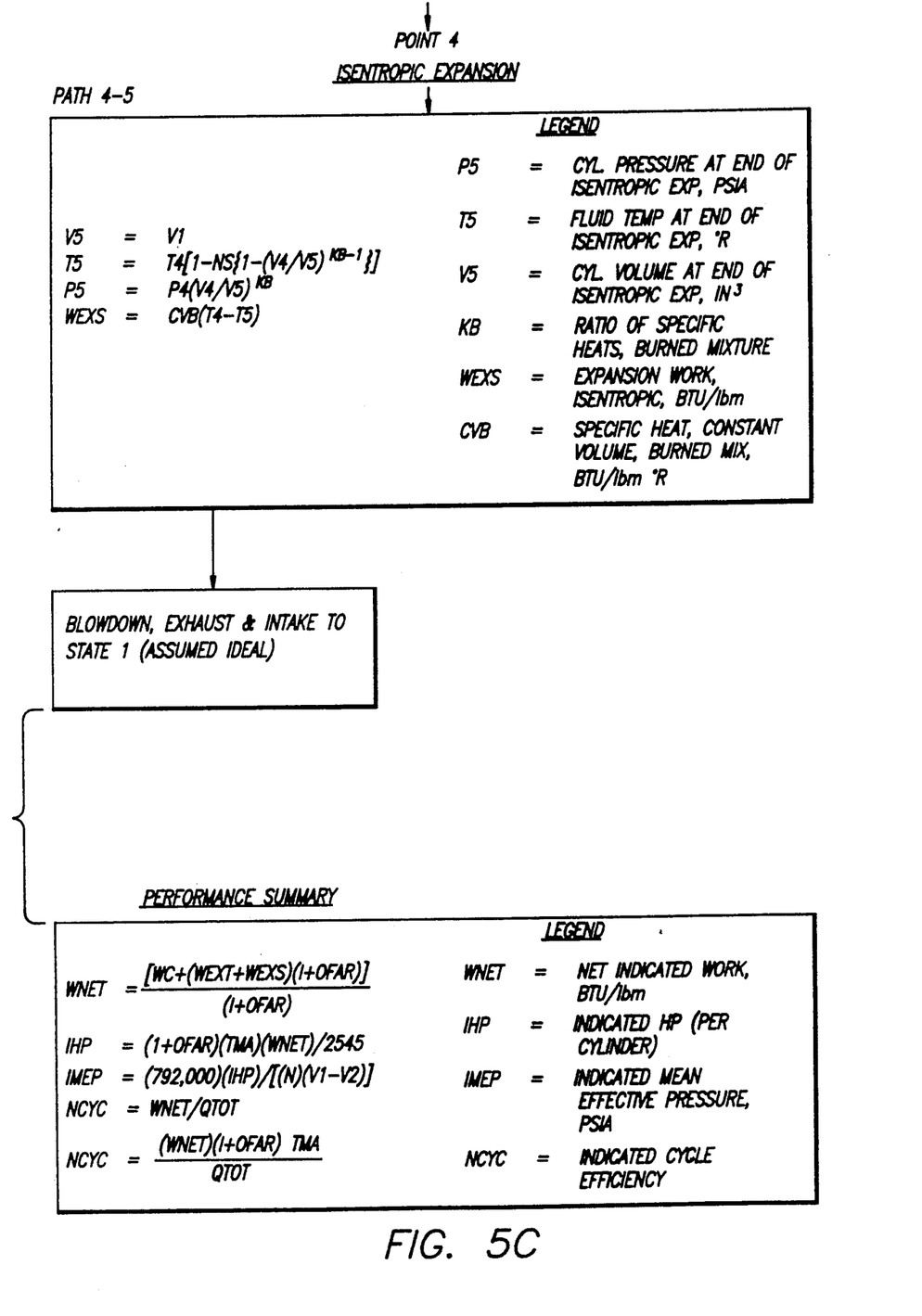

Using the ideal fuel/air analysis of FIGS. 5A–5C, the conditions or states at each point for the two examples of FIG. 4 may be calculated as follows:

FIRST EXAMPLE $CR = 18.0$  $T_{max} = 3300°$ R.
Point 1 — Initial Conditions at BDC, Intake Stroke:
$P1 = 14.7$ psia
$V1 = 50.3$ in$^3$
$T1 = 530°$ R.
$N = 2000$ RPM
$N_S = .95$
$F/A = .0416$
$M_a = 130$ lb/hr
$LHV = 18,300$ Btu/lb
$N_v = 100\%$
$NCOMB = 100\%$
where:
$P1$ = initial pressure
$V1$ = initial volume
$T1$ = initial temperature
$N$ = engine speed
$N_s$ = compression/expansion efficiency
$F/A$ = fuel air ratio
$Ma$ = air mass flow
$LHV$ = fuel lower heating value
$N_v$ = volumetric efficiency
$NCOMB$ = combustion efficiency
$Nv$ = volumetric efficiency
$NCOMB$ = combustion efficiency
Point 2 - Following Isentropic Compression (Path 1-2):
$K_a = 1.37$
$C_{v(air)} = .186$ Btu/lbm − °R.
$V2 = V1/CR = \frac{50.3}{18} = 2.79$ in$^3$ $$T2 = T1\left[\frac{\left(\frac{V1}{V2}\right)^{K-1} - 1}{N_s} + 1\right] =$$

$$530\left[\frac{(18^{.37}) - 1}{.95} + 1\right] = 1597°\text{ R.}$$

$$P2 = P1\left(\frac{V1}{V2}\right)^K = 14.7\,(18)^{1.37} = 771\text{ psia}$$

$WC = C_v(T1 - T2) = .186(530 - 1597) = -198$ Btu/lbm
Point 3 - Following Limited Temp. Comb. @ Constant Volume (Path 2-3):
$T_3 = T_{max} = 3300°$ R.

$$P3 = P2(T3/T2) = (771)\left(\frac{3300}{1597}\right) = 1593\text{ psia}$$

$C_v(ex) = .242$ Btu/lbm° R.
$V3 = V2 = 2.79$ in$^3$
$Q_{cv} = C_v(T3 - T2) = .242(3300 - 1597) = 412$ Btu/lbm
$M_f = F/A(Ma) = (.0416)(130) = 5.408$ lb/hr
$Q_{tot} = (M_f)(LHV) = (5.408)(18,300) = 98,966$ Btu/hr $$Q_{\frac{cycle}{ex}} = \frac{(N_c)(QTOT)}{(1 + OFAR)(TMA)} =$$

$$\frac{(1.0)(98,966)}{(1.0416)(130)} = 731 \text{ Btu/lbm}$$

$Q_{cv}/Q_{cycle} = 412/731 = 56.4\%$ ← % of comb at c.v.
Point 4 - Following Constant Temperature Combustion and Expansion (Path 3-4):
$Q_{ct} = Q_{cycle} - Q_{cv} = 731 - 412 = 319$ Btu/lbm ← (43.6% at C.T.
$T4 = T3 = 3300°$ R.

$$V4 = (V3)e^{\left(Q_{ct} \cdot \frac{J}{RT4}\right)} = (2.79)e^{\frac{(319)(778)}{(53.4)(3300)}} = 11.41 \text{ in}^3$$

$$P4 = P3\left(\frac{V3}{V4}\right) = 1593\left(\frac{2.79}{11.41}\right) = 389 \text{ psia}$$

$$W_{CTE} = \frac{(R)(T4)}{J}\left(\ln\frac{P3}{P4}\right)N_T =$$

$$\frac{(53.4)(3300)}{778}\ln\left(\frac{1593}{389}\right)(.95) = 303 \text{ Btu/lbm}$$

Point 5 - Following Isentropic Expansion (Path 4-5):
$K_{ex} = 1.26$
$C_{pex} = .325$
$C_{vex} = .25$
$V5 = V1 = 50.3$ in$^3$ $$T5 = T4\left[1 - N_s\left(1 - \left(\frac{V4}{V5}\right)^{K-1}\right)\right] =$$

$$3300\left[1 - .95\left(1 - \frac{11.41^{1.26-1}}{50.3}\right)\right] = 2297°\text{ R.}$$

$$P5 = P4\left(\frac{V4}{V5}\right)^{K_{ex}} = 389\left(\frac{11.41}{50.3}\right)^{1.26} = 60 \text{ psia}$$

$W_{EX} = C_v(T4 - T5) = .25(3300 - 2297) = 251$ Btu/lbm

Performance Summary of Cycle of First Example:
$W_{net} = WC - W_{EXT} + W_{EX} = -198 + 303 + 251 = 356$ Btu/lbm $$IHP = \frac{(1 + F/A)(Ma)(W_{net})}{2545} =$$

$$\frac{(1.0416)(130)(356)}{2545} = 18.94 \text{ HP}$$

$$IMEP = \frac{(792,000)(IHP)}{(N)(V1 - V2)} =$$

$$\frac{(792000)(18.94)}{(2000)(50.3 - 2.79)} = 158 \text{ psia}$$

$$N_{cyc} = \frac{W_{net}}{Q_{tot}} = \frac{356}{731} = 48.7\%$$

Point 1 - Initial Conditions at BDC, Intake Stroke:
Same as first example.
Point 2 - Following Isentropic Compression (Path 1-2):
Same as first example.
Point 3' - Following Limited Temp. Comb. @ Constant Volume (Path 2-3'):
$T_{3'} = T_{max} = 4300°$ R.

$$P3' = P2(T3'/T2) = (771)\left(\frac{4300}{1597}\right) = 2076 \text{ psia}$$

$C_v(exh) = .242$ Btu/lbm° R.
$V3' = V2 = 2.79$ in$^3$
$Q_{cv} = C_v(T3' - T2) = .242(4300 - 1597) = 654$ Btu/lbm
$M_f = F/A(Ma) = (0.416)(130) = 5.408$ lb/hr
Point 1 - Initial Conditions at BDC, Intake Stroke:
Same as first example.
Point 2 - Following Isentropic Compression (Path 1-2):

-continued

Same as first example.
Point 3' - Following Limited Temp. Comb. @ Constant Volume (Path 2-3'):

$T_{3'} = T_{max} = 4300°$ R.

$$P3' = P2(T3'/T2) = (771)\left(\frac{4300}{1597}\right) = 2076 \text{ psia}$$

$C_v(exh) = .242$ Btu/lbm° R.
$V3' = V2 = 2.79$ in³
$Q_{cv} = C_v(T3' - T2) = .242(4300 - 1597) = 654$ Btu/lbm
$M_f = F/A(Ma) = (0.416)(130) = 5.408$ lb/hr
$Q_{tot} = (M_f)(LHV) = (5.408)(18,300) = 98.966$ Btu/hr $$Q_{\frac{cycle}{ex}} = \frac{(N_c)(QTOT)}{(1 + OFAR)(TMA)} =$$

$$\frac{(1.0)(98,966)}{(1.0416)(130)} = 731 \text{ Btu/lbm}$$

$Q_{cv}/Q_{cycle} = 654/731 = 89.5\% \leftarrow \%$ of comb at c.v.
Point 4' - Following Constant Temperature
Combustion and Expansion (Path 3'-4'):
$Q_{ct} = Q_{cycle} - C_{cv} = 731 - 654 = 77$ Btu/lbm $\leftarrow (10.5\%$ at $C.T.)$
$T4' = T3' = 4300°$ R.

$$V4' = (V3')e^{\left(\frac{Q_{ct}J}{RT4'}\right)} = (2.79)e^{\frac{(77)(778)}{(53.4)(4300)}} = 3.62 \text{ in}^3$$

$$P4' = P3'\left(\frac{V3'}{V4'}\right) = 2076\left(\frac{2.79}{3.62}\right) = 1600 \text{ psia}$$

$$W_{CTE} = \frac{(R)(T4')}{J}\left(\ln\frac{P3'}{P4'}\right)N_T =$$

$$\frac{(53.4)(4300)}{778}\ln\left(\frac{2076}{1600}\right)(.95) = 72.9 \text{ Btu/lbm}$$

Point 4' - Following Isen Temperature
Combustion and Expansion (Path 3'-4'):
$Q_{ct} = Q_{cycle} - C_{cv} = 731 - 654 = 77$ Btu/lbm $\leftarrow (10.5\%$ at $C.T.)$
$T4' = T3' = 4300°$ R.

$$V4' = (V3')e^{\left(\frac{Q_{ct}J}{RT4'}\right)} = (2.79)e^{\frac{(77)(778)}{(53.4)(4300)}} = 3.62 \text{ in}^3$$

$$P4' = P3'\left(\frac{V3'}{V4'}\right) = 2076\left(\frac{2.79}{3.62}\right) = 1600 \text{ psia}$$

$$W_{CTE} = \frac{(R)(T4')}{J}\left(\ln\frac{P3'}{P4'}\right)N_T =$$

$$\frac{(53.4)(4300)}{778}\ln\left(\frac{2076}{1600}\right)(.95) = 72.9 \text{ Btu/lbm}$$

Point 5' - Following Isentropic Expansion (Path 4'-5'):
$K_{ex} = 1.26$
$C_{pex} = .325$
$C_{vex} = .25$
$V_{5'} = V_1 = 50.3$ in³

$$T5' = T4'\left[1 - N_s\left(1 - \left(\frac{V4'}{V5'}\right)^{K-1}\right)\right] =$$

-continued $$4300\left[1 - .95\left(1 - \frac{3.62^{1.26-1}}{50.3}\right)\right] = 2.275° \text{ R.}$$

$$P5' = P4'\left(\frac{V4'}{V5'}\right)^{K_{ex}} = 1600\left(\frac{3.62}{50.3}\right)^{1.26} = 58 \text{ psia}$$

$$W_{EX} = C_v(T4' - T5') = .25(4300 - 2275) = 506 \text{ Btu/lbm}$$

Performance Summary of Cycle of Second Example:
$\overline{W_{net} = WC + WEXT + WEX = -198 + 72.9 + 506 =}$ $$381 \text{ Btu/lbm}$$

$$IHP = \frac{(1 + F/A)(Ma)(W_{net})}{2545} =$$

$$\frac{(1.0416)(130)(3.81)}{2545} = 20.27 \text{ HP}$$

$$IMEP = \frac{(792,000)(IHP)}{(N)(V1 - V2)} =$$

$$\frac{(792000)(20.27)}{(2000)(50.3 - 2.79)} = 169 \text{ psia}$$

$$N_{cyc} = \frac{W_{net}}{Q_{tot}} = \frac{381}{731} = 52\%$$

In another embodiment of the invention, the fuel supplied for the isochoric event may be an amount which will produce a temperature of the working fluid of around 4,000 degrees Rankine, somewhat less than that produced by unconstrained combustion, with the remainder of the fuel supplied proportional to the increase in volume during the power stroke, to produce essentially isothermal combustion. This embodiment will produce high power, while avoiding detonation at higher compression ratios.

Figure 6:
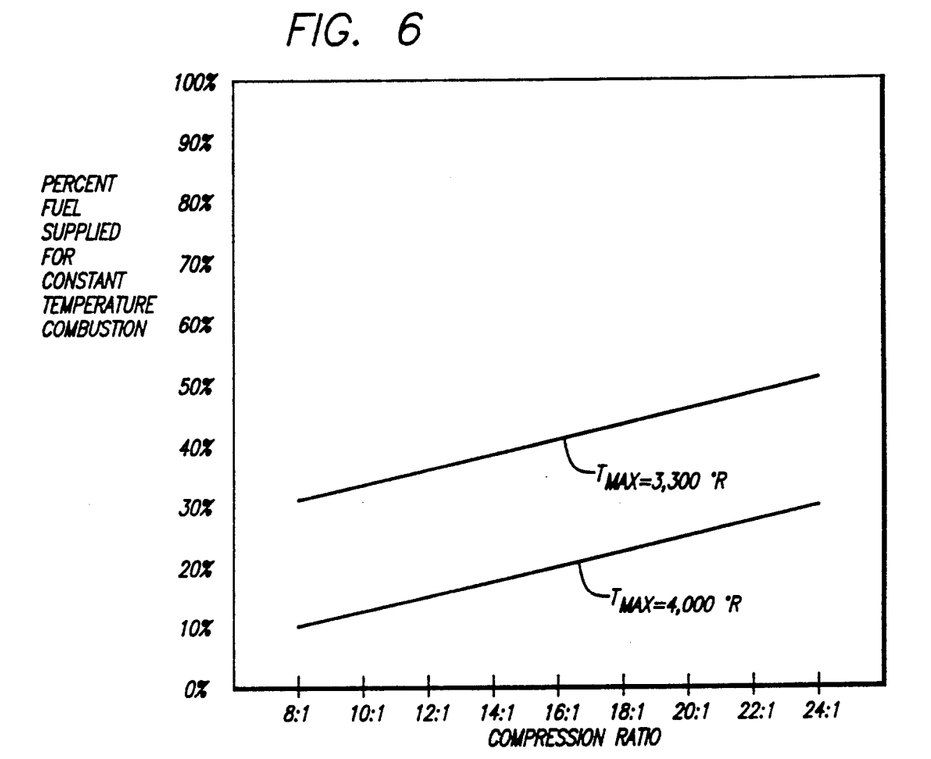
FIG. 6 includes plots of percent fuel supplied for constant temperature combustion vs. compression ratio for two maximum temperatures (3,300° R and 4,000° R)

FIG. 6 shows plots for two maximum combustion temperatures (3,300° R and 4,000° R), of percent fuel supplied for constant temperature combustion as a function of compression ratios ranging from 8:1 to 24:1.

Figure 7:
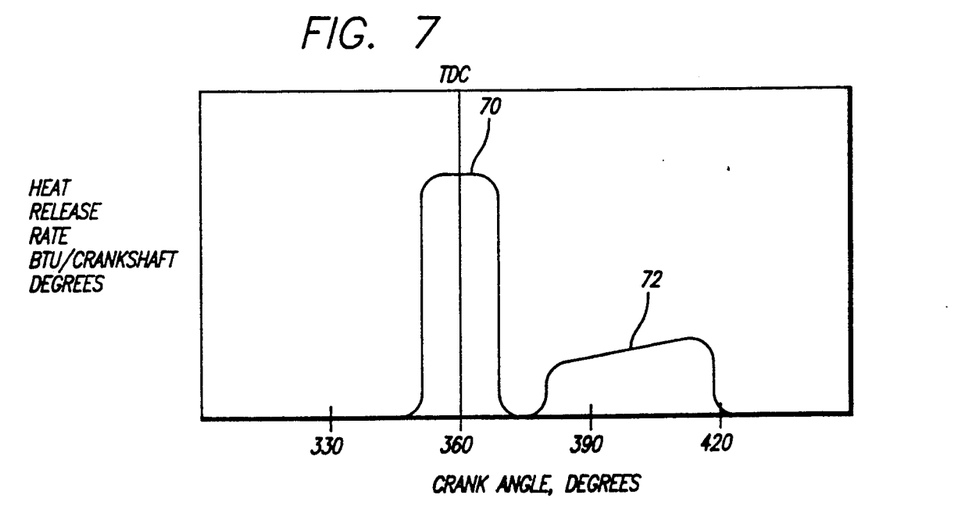
FIG. 7 is a plot of heat release rate vs. crank shaft angle for a process according to the invention having a maximum temperature of 3,300° R.

FIG. 7 is a plot of heat release rate as a function of engine crankshaft angle for a maximum combustion temperature of 3,300° R (First Example, above). A first portion 70 of this plot shows the heat release rate for the constant volume process (path 2-3 in FIG. 4). A second portion 72 of the plot shows the heat release rate for the isothermal process (path 3-4 in FIG. 4).

With reference again to FIG. 3, it will be evident to those skilled in the art that the invention may be applied to two cycle engines simply by scheduling the first injection (volume A) to take place at the beginning of the compression stroke and the second injection (volume B) to take place as in the four cycle engine. In the two cycle application, the active portion of the cam lobe must extend from the beginning of the compression stroke to the end of the isothermal combustion process. Since this is an extended duration with a significant non-utilized portion of the lift ramp, a constant radius portion on the cam can be used to avoid excessively high total cam lobe dimensions.

Instead of a fuel injection pump (as shown in FIG. 2) those skilled in the art will understand that a solenoid-controlled unit injector can be used or, as a further alternative, a common rail fuel injection system, fed by a constant-flow, high-pressure pump, can be utilized with the injectors independently controlled by solenoids. Still further, it will be obvious to those skilled in the art that piezoelectric actuators may be substituted for the solenoids where very short injector energization times (that is, small fuel quantities) are required. Piezoelectric actuators may also be utilized to provide a higher degree of control over injection since such injectors may be used to inject multiple discrete quantities with the result that the process will more closely follow the ideal isothermal process paths. In accordance with yet another alternative, a piezoelectric device may be substituted for the pump plunger in a unit injector, thus eliminating the requirement for a cam to actuate the injector. To make such an application of a piezoelectric actuator practical, the piezoelectric device would be actuated multiple times (for example, 100 times) by the electronic control unit in order to inject the required total fuel quantities with a practical size piezoelectric element.

It will also be appreciated that the process diagrams of FIG. 4 show ideal processes. Real engine paths will depart to some extent from the ideal cycles shown due to timing, heat and friction losses. These factors will manifest themselves in the cycle diagram as, for example, rounded corners and displacements of the process lines.

To practice the present invention, it is also possible to combine a standard carburetor fuel introduction system with an injector. With reference to the example of FIG. 3, with such a system, the carburetor would supply the first quantity (volume A) and the injector would supply the second quantity (volume B). The use of an injector for introducing both fuel charges is preferred, however, to minimize cost.

The invention can also be put into practice in combination with existing Otto, Diesel, lean-burn or stratified charge engine processes in the same engine at different loads or different operating conditions.

Figure 8A:
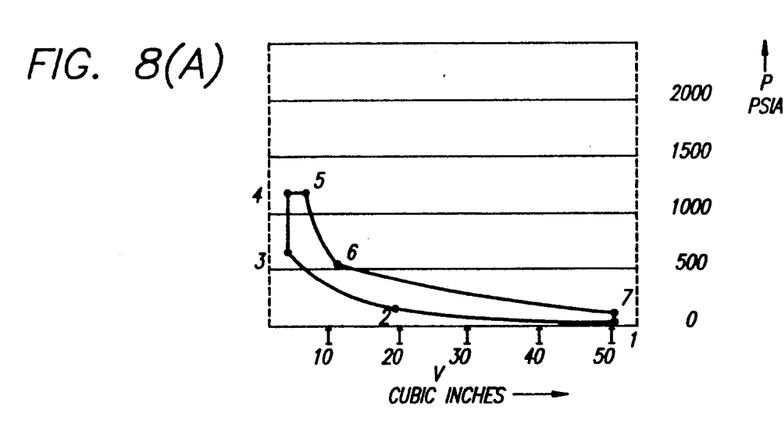
FIG. 8 shows pressure-volume and related engine cycle diagrams relating to another embodiment of the invention.
Figure 8B:
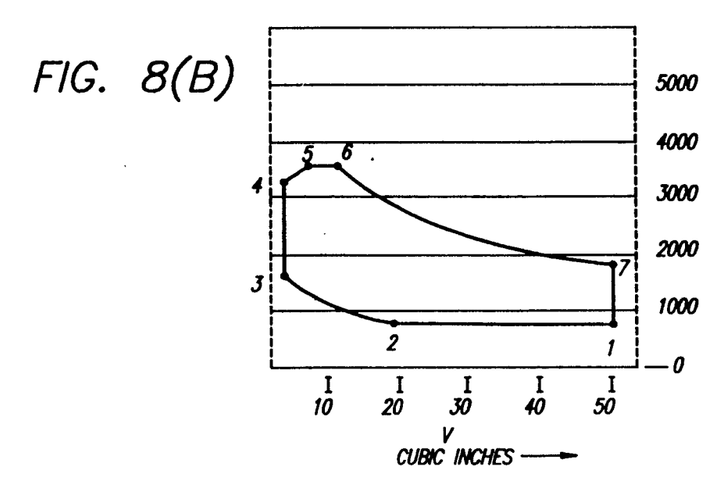
Figure 8C:
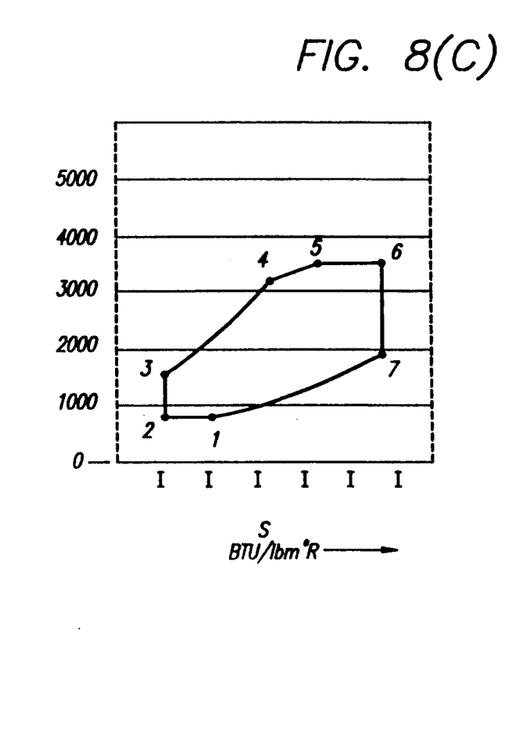

In some applications there will be a value to limiting maximum cylinder pressure. In that instance, the invention can make use of a further embodiment: a combination of constant volume combustion, constant pressure combustion, and constant temperature combustion. In this embodiment of the invention, heat is released during the constant volume process in such an amount as to reach the preferred pressure limit. Heat is then added at constant pressure until the preferred maximum temperature is reached. The remaining heat is added isothermally. An example of such an embodiment is shown in the process diagrams of FIG. 8. An engine operated in accordance with this embodiment will include, with reference to FIG. 8, the following process paths: path 1-2 is an isothermal compression process during which fuel is supplied. The fuel supplied early in the compression process serves two purposes: first, the heat of vaporization reduces the work of compression, second the combustion temperature is reduced proportional to the cooling provided by the fuel, and third, the early injection allows time for preflame reactions to take place prior to the ignition time, thus reducing ignition lag (a significant problem for Diesel or other predominantly direct injection hybrid systems). Path 2-3 is an isentropic compression process, as already explained; path 3-4 is an isochoric combustion process with maximum pressure limited to a preselected value by proportioning fuel quantity A (FIG. 3); path 4-5 is a constant pressure, i.e, isobaric, process provided by a first portion of fuel fraction B (FIG. 3), said portion being of an amount so as to continue isobaric combustion until the preselected maximum combustion temperature is reached; path 5-6 is an isothermal combustion process at the preselected maximum combustion temperature; path 6-7 is an isentropic expansion process; and path 7-1 is an isochoric exhaust process. Each of the fuel introductions can comprise one or more discrete quantities so as to follow the ideal processes as closely as practicable.

With reference once again to FIG. 3, an additional embodiment of the invention can be put into practice by subdividing the first fraction (volume A) of the total fuel quantity into one or more discrete injected fuel portions. For example, if two such portions were used, these would be designated portions A' and A", the sum of these two portions equalling the volume A. In accordance with one example of this embodiment, the first fuel portion A', comprising 40% of the total fuel, would be injected during the interval from 10° to 80° of engine crank shaft rotation and the second fuel portion A", comprising 16% of the total fuel, would be injected during the interval from 320° to 350° of engine crank rotation. This embodiment provides a chemically correct fuel/air mixture surrounding the spark plug for the first phase of combustion serving to extend the lean misfire limit as well as further reducing the creation of $NO_x$ by avoiding the presence of unburned oxygen in the first combustion phase.

It will also be understood that the invention can be used with various fuels such as natural gas, diesel, gasoline and methanol, as well as with multiple fuels including, for example, a combination of natural gas for the constant volume heat release process and diesel fuel for the isothermal heat release process.

What is claimed is:

1. A method of operating an internal combustion expanding chamber piston engine for providing limited temperature combustion, said engine having (1) at least one cylinder and an associated piston for forming a combustion chamber, said piston having a top dead center position, (2) an operating cycle including an intake stroke, a compression stroke and an expansion stroke, and (3) a fuel introduction system, said method comprising the steps of:

forming a predetermined fuel/air mixture by introducing a predetermined fraction of the total fuel required for complete combustion of the process air in the combustion chamber;

igniting said fuel/air mixture when the piston is substantially at top dead center; and introducing substantially at the beginning of the expansion stroke, a second fraction of the total fuel required for complete combustion, wherein the combustion of the fuel/air mixture resulting from the fuel first introduced is a substantially constant volume process; and wherein the combustion as a result of the introduction of the second fraction is a substantially isothermal process.

2. A method, as defined in claims 1, in which:

the fuel is introduced by direct injection.

3. A method, as defined in claim 1, wherein:

the first mentioned predetermined fraction of the total fuel is introduced during the compression stroke to provide an isothermal compression process.

4. A method, as described in claim 3, wherein:

the combustion of said first mentioned predetermined fraction is limited to a preselected maximum pressure; and wherein, the second fraction of the total fuel is supplied so as to provide, first, constant pressure combustion until a preselected maximum combustion temperature is reached, and secondly, isothermal combustion at said preselected maximum temperature.

5. A spark ignition internal combustion engine including a combustion chamber, said engine having an operating cycle including a heat input phase comprising a substantially constant volume combustion process followed by a substantially isothermal combustion process.

6. A spark ignition internal combustion engine, as defined in claim 5, including means for injecting fuel directly into said combustion chamber in phase relationship to provide said substantially constant volume and substantially isothermal combustion processes.

7. A spark ignition internal combustion engine, as defined in claim 6, including:
    means operatively associated with said fuel injecting means for controlling injection scheduling, timing and rate, said controlling means being adapted to provide:
    (1) a first injection, made up of one or more discrete quantities, comprising a predetermined fraction of the total of fuel required for complete combustion of the process air, combustion of said first injected amount of fuel comprising said substantially constant volume combustion process; and
    (2) a second injection, made up of one or more discrete quantities, comprising a second fraction of the total fuel necessary for said complete combustion, combustion of said second injected amount of fuel comprising said substantially isothermal combustion process.

8. A spark ignition internal combustion engine, as defined in claim 7, in which:
    said second fraction comprises the remainder of the total fuel necessary for complete combustion.

* * * * *

(12) EX PARTE REEXAMINATION CERTIFICATE (9090th)
United States Patent
Kruse (10) Number: US 5,265,562 C1
(45) Certificate Issued: Jun. 26, 2012

(54) INTERNAL COMBUSTION ENGINE WITH LIMITED TEMPERATURE CYCLE

(75) Inventor: Douglas C. Kruse, Chatsworth, CA (US)

(73) Assignee: Kruse Technology Partnership, Chatsworth, CA (US)

Reexamination Request:
No. 90/011,633, Apr. 7, 2011

Reexamination Certificate for:
Patent No.: 5,265,562
Issued: Nov. 30, 1993
Appl. No.: 07/919,916
Filed: Jul. 27, 1992

(51) Int. Cl.
*F02B 41/00* (2006.01)
*F02B 75/02* (2006.01)
*F02B 1/04* (2006.01)
*F02B 1/00* (2006.01)
*F02B 75/00* (2006.01)
*F02B 75/12* (2006.01)

(52) U.S. Cl. .................. 123/27 R; 123/299; 123/37
(58) Field of Classification Search ............. 123/27 R
See application file for complete search history.

(56) References Cited

To view the complete listing of prior art documents cited during the proceeding for Reexamination Control Number 90/011,633, please refer to the USPTO's public Patent Application Information Retrieval (PAIR) system under the Display References tab.

*Primary Examiner* — David O. Reip (57) ABSTRACT

An expandable chamber piston type internal combustion engine operating in an open thermodynamic cycle includes a combustion process having a constant volume (isochoric) phase followed by a constant temperature (isothermal) phase.

EX PARTE REEXAMINATION CERTIFICATE ISSUED UNDER 35 U.S.C. 307

NO AMENDMENTS HAVE BEEN MADE TO THIS PATENT

AS A RESULT OF REEXAMINATION, IT HAS BEEN DETERMINED THAT:

The patentability of claims 1-4 is confirmed.

Claims 5-8 were not reexamined.

* * * * *

(12) EX PARTE REEXAMINATION CERTIFICATE (9285th)
United States Patent
Kruse (10) Number: US 5,265,562 C2
(45) Certificate Issued: Sep. 4, 2012

(54) INTERNAL COMBUSTION ENGINE WITH LIMITED TEMPERATURE CYCLE

(75) Inventor: Douglas C. Kruse, Chatsworth, CA (US)

(73) Assignee: Kruse Technology Partnership, Chatsworth, CA (US)

Reexamination Request:
No. 90/012,211, Mar. 28, 2012

Reexamination Certificate for:
Patent No.: 5,265,562
Issued: Nov. 30, 1993
Appl. No.: 07/919,916
Filed: Jul. 27, 1992

Reexamination Certificate C1 5,265,562 issued Jun. 26, 2012

(51) Int. Cl.
| | |
|---|---|
| F02B 75/02 | (2006.01) |
| F02B 41/00 | (2006.01) |
| F02B 75/12 | (2006.01) |
| F02B 1/04 | (2006.01) |
| F02B 1/00 | (2006.01) |
| F02B 75/00 | (2006.01) |

(52) U.S. Cl. .................. 123/27 R; 123/299; 123/37
(58) Field of Classification Search .............. None
See application file for complete search history.

(56) References Cited

To view the complete listing of prior art documents cited during the proceeding for Reexamination Control Number 90/012,211, please refer to the USPTO's public Patent Application Information Retrieval (PAIR) system under the Display References tab.

*Primary Examiner* — Peter C. English (57) ABSTRACT

An expandable chamber piston type internal combustion engine operating in an open thermodynamic cycle includes a combustion process having a constant volume (isochoric) phase followed by a constant temperature (isothermal) phase.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4 is confirmed.

Claims 5-8 were not reexamined.

\* \* \* \* \*